United States Patent [19]

Brody et al.

[11] 4,152,464
[45] May 1, 1979

[54] METHOD FOR THE ASEPTIC PACKAGING OF HIGH ACID FOOD

[75] Inventors: Aaron L. Brody, Dunwoody; William E. Archibald, Marietta, both of Ga.

[73] Assignee: The Mead Corporation, Dayton, Ohio

[21] Appl. No.: 826,352

[22] Filed: Aug. 22, 1977

[51] Int. Cl.$^2$ .................... A61L 1/00; B65B 55/14
[52] U.S. Cl. ..................... 426/413; 53/471; 53/478; 53/167; 426/399
[58] Field of Search ............... 426/399, 400, 401, 413; 53/21 FC, 167, 22 A; 21/78, 79, 80, 58, 99

[56] References Cited

U.S. PATENT DOCUMENTS

| | | | |
|---|---|---|---|
| 797,298 | 8/1905 | Loew | 21/80 |
| 843,423 | 2/1907 | Weymar | 21/79 |
| 2,268,289 | 12/1941 | Kronquest | 21/80 |
| 2,296,974 | 9/1942 | Beal | 21/58 |
| 2,325,360 | 7/1943 | Ayers et al. | 426/399 |
| 2,549,216 | 4/1951 | Martin | 426/399 |
| 2,639,991 | 5/1953 | Ball | 426/399 |
| 2,702,247 | 2/1955 | Northcutt | 426/399 |
| 3,139,323 | 6/1964 | Shields et al. | 21/57 |
| 3,180,740 | 4/1965 | MacMartin | 426/399 |
| 3,438,790 | 4/1969 | Barnby | 426/399 |
| 3,839,843 | 10/1974 | Stewart | 21/57 X |
| 3,886,296 | 5/1975 | Brooks et al. | 426/399 X |
| 3,911,640 | 10/1975 | Rausing | 53/21 FC |
| 3,942,299 | 3/1976 | Bory | 53/167 |
| 3,947,249 | 3/1976 | Egger | 53/167 X |
| 4,014,158 | 3/1977 | Rausing | 53/167 |

Primary Examiner—Steven L. Weinstein
Attorney, Agent, or Firm—Earl B. Brookbank, Jr.

[57] ABSTRACT

This invention relates to a method and apparatus for the aseptic packaging of high acid food products. More specifically, the present invention is directed to a method whereby preformed barrier plastic containers are immersed in an aqueous sterilizing bath at a temperature ranging from 212° F. to 140° F. for a time interval ranging from one to sixty seconds, following which, after draining the sterilizing liquid therefrom, the containers are filled with presterilized high acid food product under essentially inert atmosphere conditions and thereafter closed in an inert atmosphere by sealing a sterile closure element thereto. Novel apparatus for automatically carrying out the method of the invention is also provided.

9 Claims, 2 Drawing Figures

METHOD FOR THE ASEPTIC PACKAGING OF HIGH ACID FOOD

BACKGROUND OF THE INVENTION

This invention relates to a method and apparatus for the aseptic packaging of high acid food products. More specifically, the present invention is directed to a method whereby preformed barrier plastic containers are immersed in an aqueous sterilizing bath at a temperature ranging from 212° F. to 140° F. for a time interval ranging from less than 1 to 60 seconds, following which, after draining the sterilizing liquid therefrom, the containers are filled with pre-sterilized high acid food product under essentially inert atmosphere conditions and thereafter closed in an inert atmosphere by sealing a sterile closure element thereto. Novel apparatus for automatically carrying out the method of the invention is also provided.

Although packaging of low pH food products has been conducted in glass bottles and metal cans for many years, costs of these containers, their closures and labels have increased rapidly. Cost of thermoplastic materials has not increased as rapidly and are also more conserving of energy on a systems basis. Therefore, packaging in thermoplastic materials represents a significant savings in packaging costs. Because of the heat sensitivity of most thermoplastics, however, conventional hot filling and terminal thermal sterilization techniques damages or destroys such packages. On the other hand, application of aseptic techniques would permit sterilization of the packages under controlled conditions which leave the packaging unaltered. As a further advantage of aseptic packaging, the product is heated and cooled rapidly prior to packaging, and so is minimally altered by processing. A higher quality product results from the practice of this invention.

The high acid food products contemplated are those juices, fruits, vegetables and products having a pH less than 4.6. Included are fruit juices, fruit juice drinks, fruit flavored drinks, nectars, sauces, and purees in fluid and semifluid form, and similar low pH dairy products such as fermented milk products, yoghurt, jam, jellies, fruit syrups, vinegar, catsup, tomato juice and gelatin desserts. Also contemplated are food products with a water activity greater than 0.85 and pH less than 4.6 such as whole, sliced and diced fruit, tomato products and formulated food products.

Microorganisms within normal tissues of fruits and related agricultural commodities most frequently are gram negative motile rods, representative of the *Pseudomonadacea* and the *Enterobacteriaceae* species. It appears that the bacteria can enter living plant tissue by various pathways and persist there as harmless commensals.

The surface flora of fruits, however, are quite different with lactic acid forming bacteria such as *Lactobacilli* and *Leuconostoc* being common. On apples, during harvest, yeasts dominate, but occasionally acetic bacteria are present in large numbers. Typically, $10^3$ to $10^4$ microorganisms per square centimeter epiderm are observed on healthy apples. These numbers rapidly increase to $10^6$ to $10^7$. In diseased fruits as many as $10^8$ microorganisms have been found on the surfaces of oranges. Thus, microorganisms are natural and normal flora in and on fruits, and serve as a reservoir to contaminate fruit products when they are processed. For example, 54 different yeasts have been isolated from unpasteurized citrus fruit juices and concentrates in typical citrus juice processing plants. The most common genera were *Candida, Pichia, Zygosaccharomyces, Saccharomyces,* and *Hanseniaspora*. Additionally, five genera of bacteria have been found in unpasteurized citrus juices, *Lactobacillus, Leuconostoc, Aerobacter, Xanthomonas,* and *Achromobacter*. An average of $10^5$ to $10^7$ microorganisms per milliliter are found in freshly extracted citrus juices.

The conspicuous characteristic distinguishing sterilization of fruit products from most other foods is their low pH which generally decreases the heat resistance of microorganisms, and is the reason that thermal sterilization of fruit products can be accomplished by heating for less than five minutes below 212° F. Yeasts are readily killed in acid food products by mild heat treatment. Yeast cell destruction can be accomplished by heating for a few seconds to a few minutes at 160° F., and their spores are destroyed at only a few degrees higher. As a rule, yeast cell destruction by heat is not greatly affected by pH. The non-sporeforming aciduric bacteria are quite similar to yeasts with respect to heat lability, but their destruction is greatly enhanced as pH decreases.

Bacterial endospores are heat resistant, but their thermal destruction also occurs readily at high hydrogen ion concentrations, i.e., low pH. At pH 4, the heat susceptability of the aciduric sporeformers is reduced so far that destruction occurs with a five minute heat treatment of 190° F. Further, these sporeforming bacteria generally do not grow below pH 4. It is important to note that the only microorganisms of concern with high acid foods are those which can survive and grow at a pH of 4.6 or lower, a category which excludes pathogenic spore forming and other pathogenic bacteria.

In accordance with the present invention, the high acid food product to be packaged aseptically is processed into the form (e.g., juice) to be packaged, and is sterilized prior to packaging by suitable means, as by heating. Thus the food product delivered to the aseptic packaging operation is essentially free of spoilage microorganisms. The preformed plastic containers into which the sterile food product is to be packaged require sterilization before the food is placed therein. These containers and closures may be fabricated at a location remote from the food packaging operation, and while fabrication thereof is conducted under conditions of good manufacturing practice, opportunities exist for the contamination thereof by undesirable microorganisms which could cause spoilage of any food packed therein.

Another essential element of this invention is the reduction in oxygen in both the product contained and in the interior of the package, and the retention of this oxygen level below one percent of the headspace volume in the sealed package. High acid food products such as fruits and fruit products are susceptible to rapid loss of vitamin C, flavor and color by exposure to excessive levels of oxygen. In conventional canning practice, product is heated and filled hot prior to closure. Upon cooling, a partial vacuum of up to 22 in. Hg is effected through condensation of head space steam. Products contained in cans and bottles thus packaged undergo oxidative biochemical changes due to the presence of occluded and dissolved oxygen in the product and of residual oxygen in the headspace. The quantities present in conventional practice are sufficient to oxidize all the vitamin C naturally present and to render the product unacceptable.

In this invention, the product is treated prior to packaging to reduce the oxygen dissolved and occluded in the product. This invention mandates that the filling and closure be conducted in an inert atmosphere such as sterile nitrogen to insure that headspace oxygen after sealing is well below 1%. Further, this invention mandates that the packaging materials be composed of oxygen-barrier materials to minimize the quantity of oxygen that can migrate through the walls of the package after closure.

PRIOR ART

Earlier proposals have been made for the aseptic packaging of high acid foods, and a variety of methods for sterilizing containers of various types. A number of methods for sterilizing use steam, e.g., Shields, et al., U.S. Pat. No. 3,139,323 mixes acids such as hydrochloric acid with the steam. Stewart, U.S. Pat. No. 3,839,843 uses acidified superheated steam for sterilizing. Other art is concerned with isolating the interior of the packaging apparatus from the outside atmosphere, to prevent air-borne contamination from entering. Simpson, et al., U.S. Pat. No. 3,376,639 describes apparatus for canning beer in metal cans using a plurality of sealing means to isolate the interior of the apparatus from ambient conditions. An earlier disclosure by Kronquest, U.S. Pat. No. 2,268,289 relates to apparatus for packaging fruit juices, but the apparatus described is only semi-automatic, and is specific to metal containers and rigid metal covers.

SUMMARY OF THE INVENTION

The present invention is directed to a method for the aseptic packaging of high acid foods having a pH of 4.6 or less in sterilized, pre-formed plastic containers. The head space in the filled container is filled with inert gas prior to sealing with a heat sealed closure element. Apparatus for carrying out the method is provided, the apparatus being fully automatic. As set forth in more detail hereinafter, preformed plastic containers are immersed in an aqueous sterilizing bath at a temperature ranging from 212° F. to 140° F. for a time interval ranging from less than 1 to 60 seconds, following which, after draining the sterilizing liquid therefrom, the containers are filled with pre-sterilized food product and thereafter closed in an inert atmosphere by heat sealing a sterilized closure element thereto.

DETAILED DESCRIPTION

Figure 1:
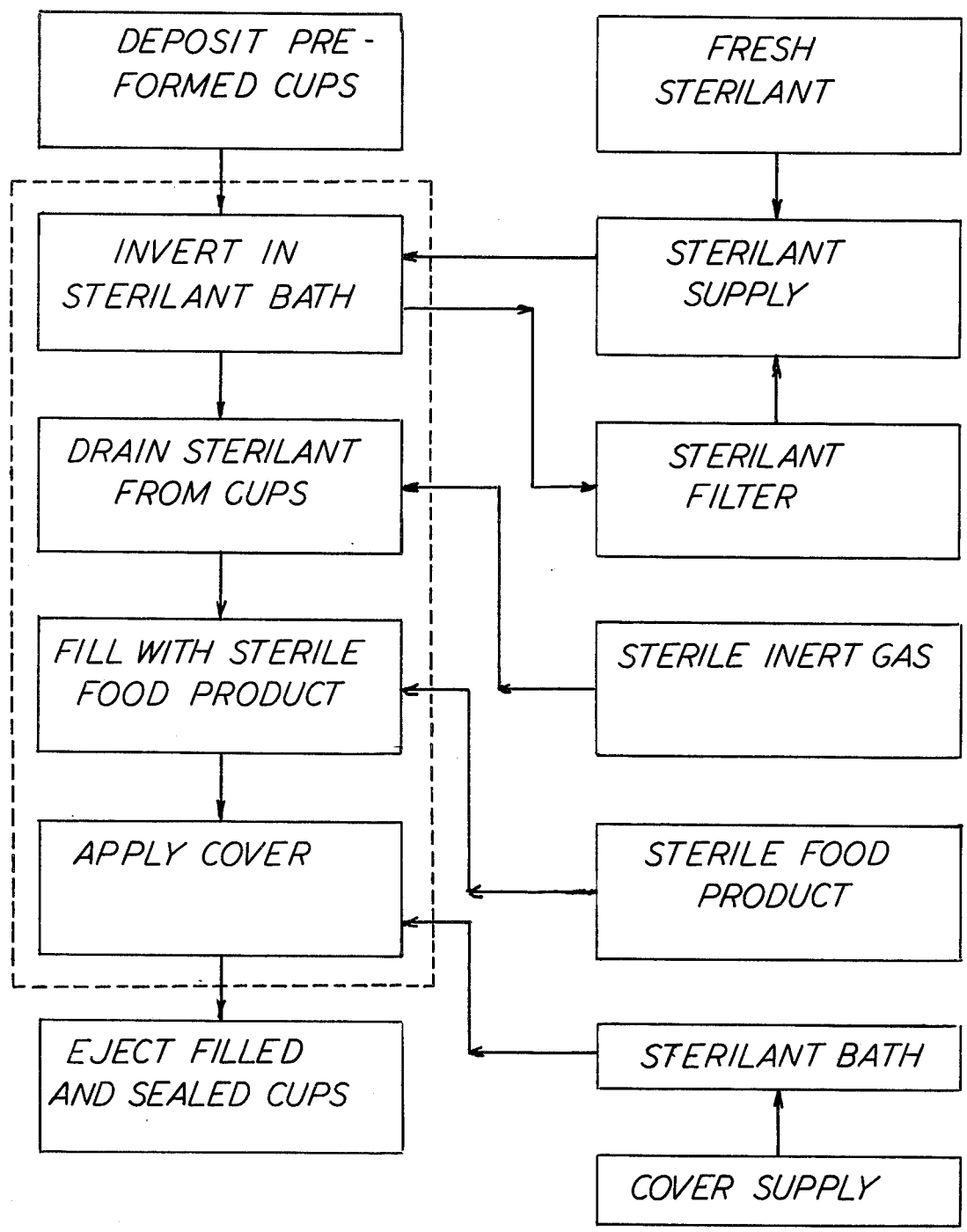
FIG. 1 is a flow diagram outlining the sequence of steps in carrying out the process of this invention.

According to the invention, preformed plastic containers or cups are delivered to an infeed section of the aseptic packaging apparatus or machine. The plastic cups can be produced at a remote location and shipped to the packaging operation, and, of course, can be inventoried. The cups are formed from a barrier thermoplastic by any convenient means, such as thermoforming from sheet or film material, injection molding, blow molding, etc. There are several requirements for the plastic from which the cups are formed. The material must be non-toxic, and not permit the migration to the food product of any unsafe indirect food additive. The material must be an effective barrier to the migration of flavors and odors therethrough, and must not impart any undesirable taste or odor to the food products packaged therein. The plastic must also be an effective barrier to the transmission of water vapor. Most important, the thermoplastic must be an effective oxygen barrier at room temperature. An effective oxygen barrier is defined as one which permits permeation passage of oxygen gas of less than 0.05 ml. $O_2$ per package per 24 hours at one atmosphere pressure, 70° F. and 50% relative humidity. Additionally, a high heat distortion temperature is desired to allow greater latitude in selection of sterilization temperatures.

The required properties as recited above may be obtained by the use of, for example, copolymers of acrylonitrile and styrene, with the acrylonitrile component amounting to 60–75% of the polymer. While this is a preferred material, others such as polyethylene terephthalate or polyvinylidene chloride and polyvinyl alcohol may be used, and layered constructions, such as co-laminations or co-extrusions of diverse materials including polyacrylonitrile copolymers, polyester, polyvinylidene chloride and polyvinyl alcohol may be combined to give the desired properties in the preformed cups.

Preformed containers are delivered to the packaging machine and deposited in carrier plate receptacles in cup-conveying means which serve to carry the cups through the sterilizing and packaging operations. The cup conveying means then carries the cups into and inverts them in a supply of sterilant contained in a reservoir or bath. The amount of sterilant in the bath is kept at a constant level and temperature and is sufficient to immerse the cups completely during their passage through the sterilant bath.

In operation, the sterilant is circulated through the bath from a supply tank, and any foreign matter or dirt picked up by the sterilant are removed by passing the sterilant through a suitable filter or other separator. Temperature of the sterilant is maintained by suitable heating means and thermal controllers, and is generally in the range of 140° F. to 212° F. The composition of the sterilant may be water or water mixed with an organic acid, such as an organic acid obtained from natural sources, such as citric, malic, fumaric, succinic, tartaric, adipic or other acid derived from fruit products. The addition of an acid to the sterilant is optional, as it has been found that water alone, at the temperature range given above, is effective in killing or inactivating the microorganisms of concerns. If an organic acid is used, however, the sterilant is adjusted to pH 2 to 4.

The speed of operation of the machine, and hence the speed of the cup conveying means, determines the length of time the plastic cups are immersed in inverted position in the sterilant bath. At slower speed, the time of immersion is increased, while at higher operating speed it is decreased. It is known that the time required for sterilization depends on the sterilizing temperature used. In the temperature range of 140° to 210° F., measurable microbicidal effects are found. A temperature of 210° F. is above the heat distortion point of acrylonitrile-styrene copolymers, and 205° F. is a more realistic upper limit. At 205° F., an eight decimal reduction in microbial count is effected in less than one second. Also, temperature as low as 140° F. requires up to 3.5 minutes for effecting a three-decimal reduction in the count of micro-organisms. A temperature of sterilant this low imposes an unnecessarily slow operational rate on the packaging machine, and is preferably avoided. At 160° F., on the other hand, the time required for an eight decimal reduction in the count of microorganisms of consequence is less than 5 seconds, which is short enough to permit an acceptable operating speed without concomitant extension of the length of path the conveying means must keep the cups immersed. The following data are pertinent:

| D VALUES AT VARIOUS TEMPERATURES (D=one decimal reduction) | |
|---|---|
| Temp., ° F. | Sec. for 1 D Value |
| 140 | 0.58 |
| 150 | 0.35 |
| 160 | 0.26 |

At 170° F., the time was too short to be determined experimentally. Historically, superheated steam was the preferred means of sterilization in canning food products. Containers used were traditionally either metal cans or glass jars, both of which can withstand the temperature of live steam, even at elevated pressure, or with superheat. The plastic containers of this invention introduce limitations on the maximum temperature used in sterilizing, which must be below the heat distortion temperature of the plastic used for the cups. While the art shows methods whereby steam or acidified steam at atmospheric pressure is condensed on container surfaces which are maintained below 212° F., such as a temperature in the range of 160° F. to 210° F., and it is intended that the steam or acidified steam condense into a liquid film thereon, in practice with plastic containers, the condensing steam or acidified steam forms a layer of discrete droplets on the plastic surface, which is not wetted as readily as glass or metal surfaces. Interfacial surface tension between a solid and droplets of liquid resting thereon is measured as the contact angle between the liquid and the solid. Generally, for a droplet of liquid to spread on a flat surface, the contact angle must be less than 5°. Actual measurements of contact angle of distilled water at room temperature on clean polystyrene plastic is about 80° and on cleaned polyacrylonitrile polystyrene copolymer is 60°. Thus, using condensing steam or acidified steam for sterilization does not assure that there will be liquid contact over every element of the surface of the plastic, and either elevated temperature or prolonged treatment is necessary to accomplish sterilization. It appears that sterilizing time must be sufficiently long for thermal conduction of heat from droplet covered areas to adjacent unwetted areas in order for the sterilization to be effective.

In any event, the present sterilizing method whereby the cups are immersed in sterilizing liquid avoids any problems of incomplete wetting from condensing vapor. That applicant's method is effective is shown by the short time requirements at relatively low temperature to accomplish as much as an eight decimal reduction in the number of organisms surviving the sterilizing treatment.

Following completion of the sterilizing step, the cup conveying means moves upwardly out of the sterilant bath into an enclosed space containing a sterile inert gas such as nitrogen, thus allowing the liquid sterilant to drain by gravity from the interior of the cups. If desired, jets of sterile gas may be directed into the cups to remove any small amount of sterilant which may be adhering to the surfaces thereof. However, this is optional, although the closure area at the top of the cup should be dry when heat sealing is employed. Since the sterilant is water, or water containing small amounts of natural organic acid derived from food products, such residuals constitute undetectable materials which are already constituents of the food product.

After the cups have drained, the conveying means passes around guide means which turns the cups to an upright position. Further movement carries the cups to filler means, where pre-sterilized food product is metered into the cups. Ideally, the food product is sterilized by very short exposure to high temperature (flash heating in less than 10 seconds) followed by rapid cooling. This method of sterilizing the food product results in a minimum effect on the flavor thereof. However, other methods of sterilizing the food product may be used so long as the product supplied to the filler means is essentially sterile. Filling is effected in an atmosphere of sterile inert gas such as nitrogen. Maintaining the entire enclosed volume free of oxygen ensures against loss or damage to flavor, color or vitamin C content because of interaction between the food product and oxygen.

The filled cups are closed by heat sealing a cover element thereto. The cover elements may be fed into the machine in the form of a web. A web of heat sealable flexible cover elements is passed through a sterilizing operation such as immersion in a heated liquid sterilant and is then delivered so as to overlie the filled cups. Heat and pressure to effect sealing of the cover to the cup are applied, and the cover is severed from the web by die elements associated with the heat sealing pressure element. If desired, the individual covers may be partially cut from the web of cover elements prior to application to the cup. Such pre-cutting of individual cover elements is limited so as to provide strips of covers which are still fastened together in a continuous supply. Similarly, waste from the cover web may be maintained in a continuous form so that it may be easily removed from the packaging machine and wound up for ready disposal, or may be die cut during the converting and printing operation to eliminate any scrap material at the packaging machine.

Flexible heat sealable cover material may suitably be a laminated web of metal foil and plastic film which carries a layer of heat activated sealant on one side thereof, or an equivalent lamination or comaterial. The sealant is selected to give tight leak-proof hermetic bonds to the material used for making the cups.

After completion of the closure operation, the completed packages are ejected from the packaging machine through a lock which prevents microbial contamination or entry of oxygen, and the cup conveying means returns to the point at which the preformed cups are fed into the machine.

Figure 2:
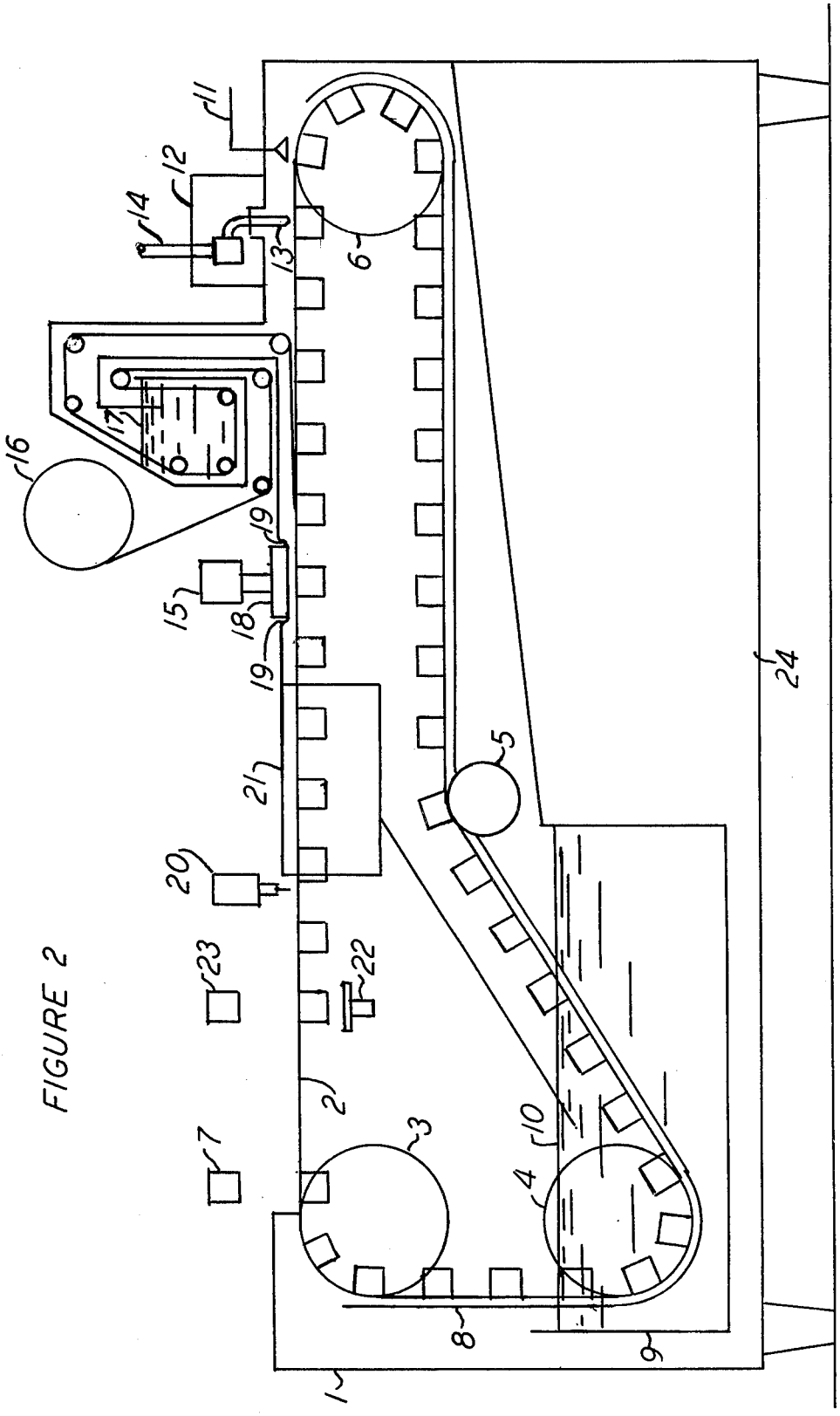
FIG. 2 is a diagrammatic sectional elevational view of one apparatus for carrying out the process of the invention.

The various steps of the process described above are shown in diagrammatic form in FIG. 1. Note that the process steps inside the dotted line are carried out under sterile conditions inside the packaging apparatus. Also, the entire internal structure of the packaging apparatus is pre-sterilized as by steam or hot water prior to the start-up of food packaging operations. These features of the process and the apparatus will be more evident from FIG. 2 and the description which follows:

Referring to FIG. 2, the packaging apparatus of this invention is generally indicated by 1, and is fully enclosed by a hood or shroud which permits sealing of the interior thereof from outside ambient air, a feature which permits maintainance of sterile and inert atmospheric conditions inside the machine. Located inside the machine is a cup conveying means, 2, which is composed of a series of orifice carrier plates connected together with chains to form an endless belt. The orifice carrier plates have holes which are shaped to conform to the shape of the preformed cups, which cups extend through the plate and are retained with the cup sealing flanges conforming to the shaped surfaces of the plates. The cup conveying means 2 passes around a series of drive and guide sprockets 3,4,5, and 6 so that the cup conveying means can move the cups through a sequence of machine operations as set forth below.

A supply of pre-formed cups is provided as indicated at 7, the cups being positively delivered into orifices in the carrier plates of the cup conveying means which carries the cups around guide sprocket 3 into a generally downward travel. Continuing downwardly and around sprocket 4, the cups are carried below the surface of a reservoir of liquid sterilant 10 contained in sterilant tank 9. As the cup conveying means travels around sprocket 4, the cups are turned to an inverted position. Cup retainer rail 8 is disposed along the path of travel of the cups through this portion of the machine to prevent cups from falling out of the orifice carrier plates, while inverted, by action of gravity. The arrangement of the cup travel through the sterilant tank or reservoir is such that the cups are completely flooded with the liquid sterilant and all traces of air are displaced therefrom to insure liquid contact over all internal surfaces of the cups. The supply of sterilant in tank 9 is maintained at a temperature in the range of 140° F. to 212° F., and the speed of travel through the sterilant is such as to keep the cups immersed in the liquid for a period of 1 to 10 seconds. Fresh sterilant is supplied to tank 9 from a source outside the machine (not shown), and sterilant from the machine tank 9 is continuously recirculated through filtering and heating means (not shown), to maintain the temperature and cleanliness thereof.

Following passage through the sterilant bath, the cups travel upwardly out of the sterilant tank and around guide sprocket 5 and then generally horizontally to drive sprocket 6. Sterilant drains from the inverted cups during this portion of their travel through the machine. The entire inner atmosphere of the machine is an inert sterile gas such as nitrogen. If desired, jets of sterile inert gas may be directed inside the cups during this portion of their travel to sweep remaining traces of the liquid sterilant therefrom. Such gas jets 11 may also be directed to the sealing rim or flange areas of the cups to insure that such sealing areas are dry and free of liquid which might interfere with the later sealing operation.

Next, the cup conveying means travels around sprocket 6, turning the cups to an upright position, and then carries them to filler station 12. Here, filler nozzle 13 delivers a metered amount of food product into the cup, and nozzle 13 is supplied by conduit 14 with presterilized food product. Filler 12 and its associated parts are designed to deliver food product into the cups without splashing of the food, and without contaminating the sealing flange or rim of the cups with particles or droplets of the food product.

The cup conveying means next carries the cups to a sealing station, indicated generally at 15. A supply web of cover material 16 is passed through a sterilant bath 17 and into proximity above the flanges of the cups. Sealer 15, operating heat sealing element 18 applies the cover material to the top of the filled cups and seals the cover material thereto by the action of heat and pressure. Reciprocating vertical movement of the sealing element 18 is permitted by flexible diaphragm 19 which separates the sealing element from the sterile and inert atmosphere of the interior of the machine.

If desired, the cover material may be cut to the desired shape of the cup and waste cover material can be stripped from the cups by die cutting and stripping means 20, the waste material, still interconnected, passing out of the machine and being wound into a roll for easy disposal. Alternatively, the cover web may be pre-cut into strands of interconnected covers prior to delivery to the machine, and, following the sealing operation, merely cut apart, thus eliminating any stripping of waste cover material from the filled and sealed cups. Note that cutting means 20 may be located immediately following sealing means 19, or may be spaced therefrom and follow after cups have moved past a microbiological barrier 21. This barrier may suitably be a water curtain, which separates the interior, sterile part of the machine from the ambient air.

The cup conveying means next carries the finished cups to an ejection mechanism indicated at 22 where cups are displaced from the cup conveying means and removed from the machine. Thereafter, the cup conveying means completes its travel and returns to cup supply means 7. While details are not shown, drive means for the cup conveying means may be conveniently located in the lower portion of the machine as indicated at 24. Note that motion of the cup conveying means is intermittent, and is synchronized with the operation of filler means 12, sealing means 15, and cutting and stripping means 20.

Although several embodiments have been described hereinabove, it is apparent that other changes and modifications can be made to the apparatus and method disclosed herein without departing from the scope of the invention, which is determined by the following claims.

What is claimed is:

1. A method for the aseptic packaging of high acid foods comprising the steps of
   A. completely immersing oxygen barrier preformed plastic cups in a bath of liquid sterilant in such a manner as to displace completely all of the air from said cups, said immersion being for from less than 1 second to 3.5 minutes at a bath temperature ranging from 205° F. to 140° F., respectively, said sterilant consisting essentially of water
   B. removing said cups from said sterilant bath and draining said sterilant therefrom,
   C. filling said cups with presterilized high acid food product having a pH of less than 4.6,
   D. sealing a sterile cover element to close said filled cups,
   E. the aforesaid steps (B) through (D) being carried out in an enclosed space filled with sterile inert gas.

2. Method according to claim 1 wherein following drainage of sterilant therefrom, said cups are subjected to jets of sterile inert gas to remove further amounts of sterilant which may be adhering to the inner and sealing surfaces thereof.

3. Method according to claim 1 wherein said inert gas is sterile nitrogen.

4. Method according to claim 1 wherein said cover element comprises semi-rigid metal elements affixed to said cups by mechanical double seaming.

5. A method according to claim 1 wherein the presterilized high acid food product is cooled prior to filling said cups.

6. A method for the aseptic packaging of high acid foods comprising the steps of
  A. delivering a supply of preformed oxygen and water vapor barrier plastic cups to aseptic packaging apparatus,
  B. completely immersing and inverting said cups in a bath of sterilant liquid in such a manner as to displace completely all of the air from inside said cups, said sterilant liquid being maintained at a temperature in the range of 205° F. to 140° F. with an immersion time interval of from less than 1 second to 3.5 minutes, respectively, said sterilant liquid consisting essentially of water,
  C. removing said cups from said sterilant bath and draining sterilant liquid therefrom,
  D. directing jets of sterile inert gas into said cups to remove additional amounts of sterilant liquid therefrom and to dry the closure areas of said cups,
  E. filling said cups with presterilized high acid food product having a pH of less than 4.6,
  F. sterilizing a continuous strip of cover elements,
  G. delivering said sterile strips of cover elements to said filled cups,
  H. heat sealing said cover elements to said cups to close same and severing individual cover elements from said strip of cover elements to provide individual filled and sealed plastic cups,
  I. the aforesaid steps (C) through (H) being carried out in a sterile oxygen-free atmosphere.

7. Method according to claim 6 wherein said preformed plastic cups are made from material selected from copolymers of acrylonitrile and styrene or acrylonitrile and methyl methacrylate in which the acrylonitrile component comprises more than 50% of the polymer, polyethylene terephthalate, polyvinylidene chloride or polyvinyl alcohol.

8. Method according to claim 6 wherein said presterilized food product is processed to remove occluded and dissolved oxygen therefrom prior to filling said cups therewith.

9. Method according to claim 6 wherein said oxygen-free atmosphere is sterile nitrogen gas.

* * * * *